United States Patent Office 3,460,691
Patented Aug. 12, 1969

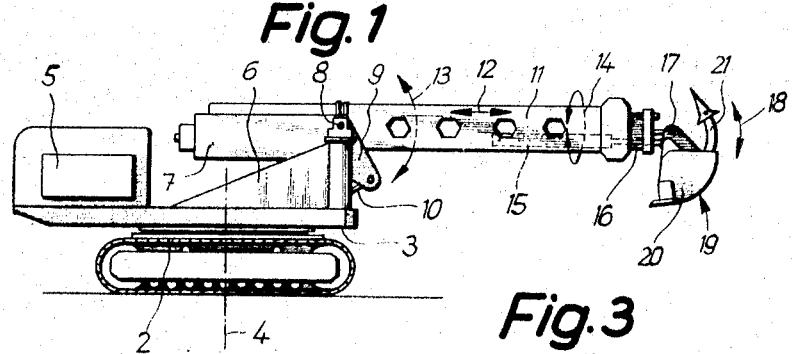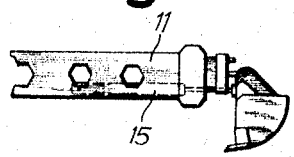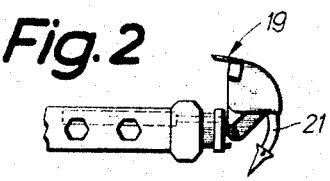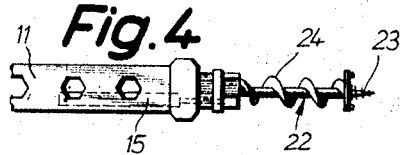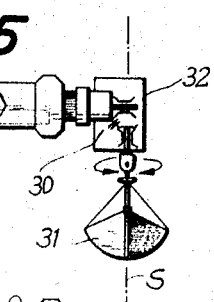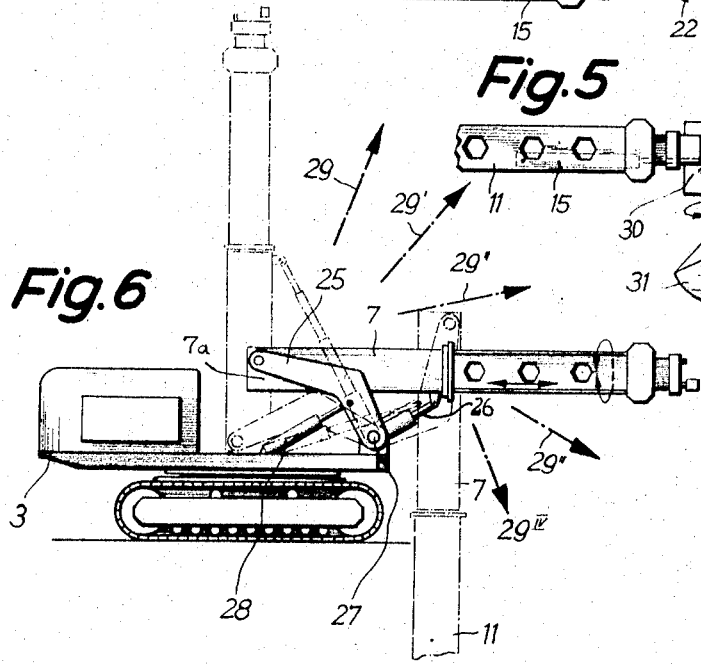

3,460,691
TELESCOPIC DREDGE
Ernst Wieger and Erhard Wieger, Dusseldorf, Germany
(both of Neuss a. Rh., Budencherstrasse 13, Neuss,
Germany)
Filed Feb. 27, 1967, Ser. No. 618,610
Claims priority, application Germany, Feb. 26, 1966,
W 41,017; Nov. 26, 1966, W 38,590
Int. Cl. E02f 3/00; B62d 21/14, 55/00
U.S. Cl. 214—141                     8 Claims

ABSTRACT OF THE DISCLOSURE

This invention relates to a telescopic dredge in which the boom comprises two sections, namely an inner section and an outer section, said outer section being telecopically movable relative to said inner section and comprising means rotatable about an axis extending in the longitudinal direction of the boom. The rotatable means are adapted detachably to receive an earth-working tool for selectively rotating the same, as for instance a drill, or for alternately shifting a double-purpose earth-working tool, such as a combined pick and grab bucket, into one position for operating said pick and into another position for operating said grab bucket.

---

The present invention relates to a telescopic dredge with a boom mounted on a turntable, which includes a boom section which is connected to the turntable and is adjustable as to height and a further boom section which is telescopically adjustable relative to said first boom section, while at the front end of said second boom section there is provided a ground-working device.

Telescopic dredges of this type are known in which the length of the hydraulic hoses leading to the devices in the rotatable and longitudinally adjustable boom section is so selected that said boom section will be able to carry out a rotary movement of 180°. For purposes of protecting the said hoses, abutments are provided for limiting the said turning movement.

It is an object of the present invention to improve telescopic dredges of the above mentioned general type in such a way that the flexibility as to use of the dredge as well as its working speed will be increased.

It is another object of this invention to provide an improved telescopic dredge as set forth in the preceding paragraph, in which the improvement will be realized with relatively simple means and, if desired, can be installed in previously designed telescopic dredges of the above mentioned type.

These and other objects and advantages of the invention will appear more clearly from the following specification in connection with the accompanying drawings, in which:

FIGS. 1 and 2 illustrate a telescopic dredge with a combined loosening and dredging device.

FIG. 3 shows the possibility of an arrangment of a heretofore known dredge bucket.

FIG. 4 diagrammatically indicates the mounting of a drilling and removing device at the front end of a boom section which is rotatable to any desired extent.

FIG. 5 shows the front end of the same boom section as referred to in FIG. 4 but with a grab bucket.

FIG. 6 is a further embodiment of a telescopic dredge according to the invention in which the boom section connected to the turntable is turnable by an angle of 180°.

Figure 7:
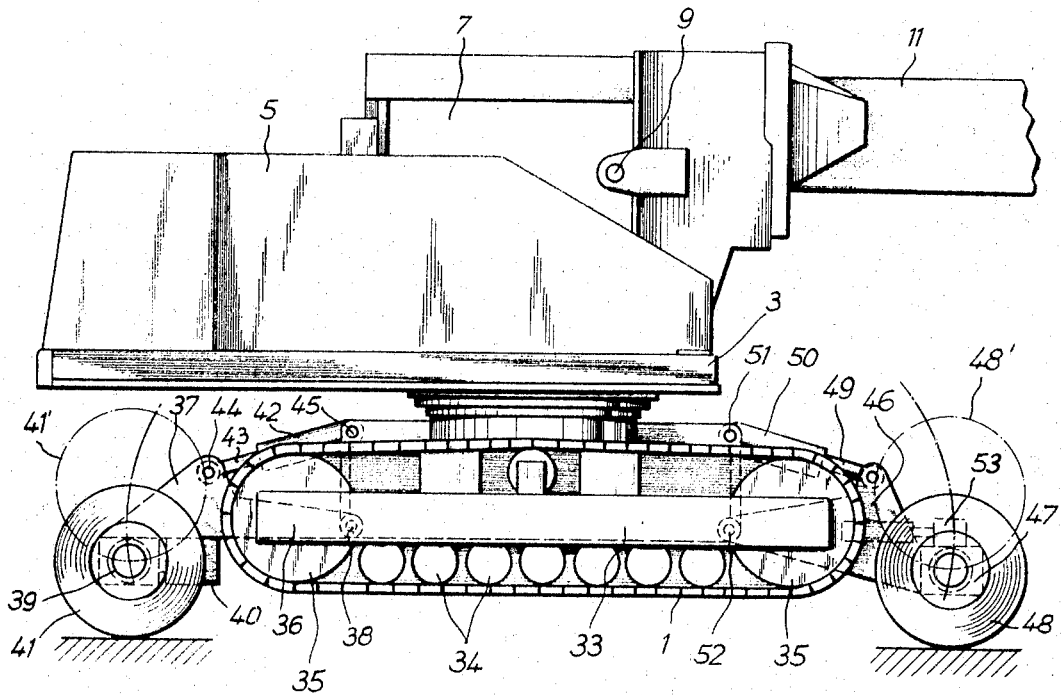

FIG. 7 shows the understructure of a dredge according to the invention.

Figure 8:
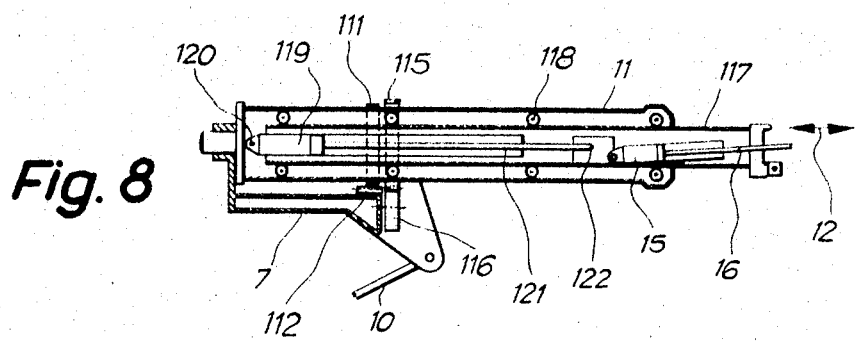
Figure 9:
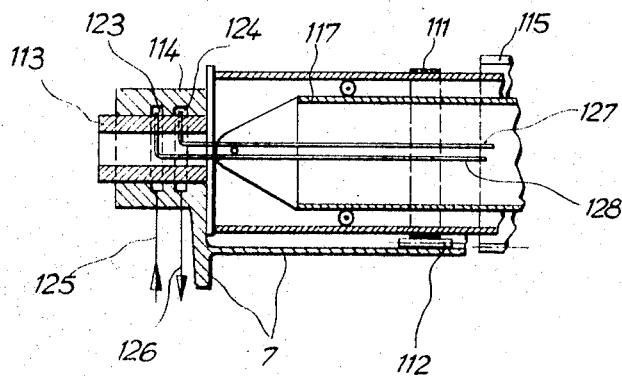
Figure 10:
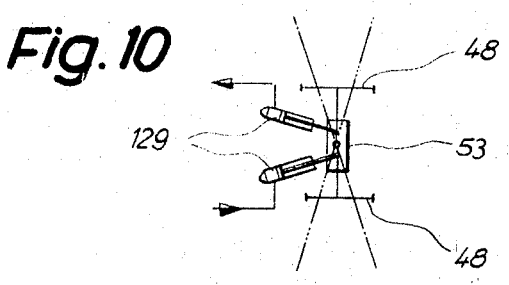

FIGS. 8–10 show further details of the invention, and in particular with regard to the telescopic boom section.

A telescopic dredge of the general type involved and set forth in the opening paragraphs to the specification is in conformity with the present invention characterized in that the telescopically longitudinally adjustable boom section is rotatable in at least one direction of rotation to any desired extent while its front end carries a detachably arranged drilling and soil-removing device. The principle according to the present invention is also applicable to a telescopic dredge in which the front end of the rotatable boom section is provided with tiltably arranged working tools. With telescopic dredges of this type, the telescopically longitudinally adjustable boom section is in conformity with the present invention rotatable in one direction of rotation without any limits while the tiltable working tool is designated as a tool which is effective in one tilting direction as loosening tool and is effective in the other tilting direction as dredge bucket.

In view of the fact that one of the boom sections is rotatable to any desired extent, i.e. without limits according to the last mentioned embodiment, there is obtained the possibility of using one or the other tool in quick succession and of turning said tool laterally at will. Thus, when heavy soil is dug up or lifted or big rocks are to be loosened and lifted, the loosening tool can be turned or tilted within a range of 180° and more, whereas when the dredging bucket is employed, the latter can be actuated over the same tilting range so that, for instance in a corresponding periodically uninterrupted but infinite rotary movement, aternately the loosening tool and the dredging bucket can be employed whereby a time-consuming reversal of the moving direction will be avoided.

Thus, a dredge according to the invention can be employed as drilling device but also affords the possibility of increasing the working speed when loosening and removing soil.

According to a practical realization of the present invention, the hoses leading to the pneumatic or hydraulic devices in the boom section which is rotatable to a limited extent only, are connected in a manner known per se by a pneumatic or hydraulic swiveljoint.

A particularly advantageous embodiment of the telescopic dredge according to the invention with a drilling and soil-removing tool is obtained when the two boom sections are steplessly tiltable by 180° from a vertically upwardly directed position. In such an instance, it is possible to drill vertical bores, for instance for telephone poles or the like, but it is also possible to drill horizonal bores and bores in hillsides. If as tool at the front end of the boom section, which is rotatable without limitation, a combined loosening and dredging tool is selected, vertical walls as, for instance, bulkheads, can easily be built up.

For purposes of tilting the two boom sections about 180°, the rear end of the non-rotatable boom section is by means of a bent linkage system, and the front section of this boom section is through a longitudinally adjustable and tiltable member connected to the turntable of the telescopic dredge. Between the linkage system and the turntable there is arranged a further longitudinally adjustable device.

The understructure of the dredge may be equipped with two track-laying chains, and triangular-shaped tiltable booms may be arranged on the two understructure ends. The free end of said triangular-shaped booms carry the wheel bearings of wheel axles and by means of a fluid pressure cylinder piston system at the tip of the triangle are pivotable about their connecting point on the understructure and have at least the steering means for a pair of wheels. The boom or booms may at one end of the understructure be connected with a steering bar and a steering shaft, and the boom or booms of the second understructure may be provided with a rigid or driving shaft as full or semi-shaft with a driving motor.

Referring now to the drawings in detail, the structure shown therein comprises a vehicle frame 2 provided with wheels and track-laying chains 1 (see FIG. 7). Rotatably supported by frame 2 is a turntable 3 which is rotatable about a vertical axis 4 in an unlimited manner. The turntable 3 supports the driving unit 5 and the cab (not illustrated in the drawing).

Between the two walls 6 or a similar device, there is provided a boom section 7 which is tiltable about a horizontal axis 8 and is equipped with two lateral extensions 9 the free ends of which are engaged by a piston rod 10 of a tiltable fluid operable cylinder piston system or fluid operable cylinder piston systems.

Opposite the boom section 7 there is provided a further boom section 11 which is displaceable in the direction of the double arrow 12. The boom sections 7 and 11 form the boom of the telescopic dredge which is tiltable about the axis 8 in the direction of the double arrow 13.

In conformity with the present invention, the telescopic section 11 is rotatable in an unlimited way relative to the telescopic section 7 in at least one direction of rotation, preferably in both directions of rotation in conformity with the double arrow 14. In order to realize this unlimited rotatability, between the driving unit 5 and the devices for actuating the tools, the front end of the boom section 11 is equipped with hoses which are connected to said front section by means of pneumatic or hydraulic pivot joints.

Such a device for actuating a tool at the front end of the boom section 11 is represented by the hydraulic cylinder 15 the piston rod 16 of which is connected to a tool 19 which is pivotable about a pivot 17 in the direction of the double arrow 18. This tool is so designed that in the tilting direction of the double arrow 18 it is adapted to become effective once as dredge bucket 20 and another time as loosening tool 21.

When the tool 19 occupies a position in which the dredge operates with the dredge bucket 20, the latter is adapted to be tilted from the illustrated position by 90° toward both sides which means that the dredge bucket is in a position to work the side walls of a ditch. When the device 19 occupies the position shown in FIG. 2, the loosening tool 21 is effective which is adapted again to work by 90° toward both sides from the position shown in the drawing. The most favorable manner of operation with the combined device is obtained by periodically uninterruptedly turning the boom section in one direction, while when interrupting the rotational movement in one direction, the tool is tilted.

According to the embodiment of FIG. 4, the working tool according to FIGS. 1 and 2, 3, has been replaced by a drilling and soil-removing tool 22 the front end of which carries the drilling device 23 while its intermediate and rear portion is equipped with the soil-removing device in the form of a worm 24. Instead of the device 19 or the tool 22, it is also possible in conformity with the embodiment of FIG. 5, to detachably equip the front end of the boom section 11 which is rotatable in an unlimited manner, with a grab bucket 31 which by means of a bevel gear drive 30 is rotatable in an unlimited manner about a vertical axis S. The bevel gear drive 30, which is journalled in a housing 32 that is suspended on the boom section 11 and rotatable relative thereto, conveys the rotational movement of the boom section 11 to the grab bucket 31 which is opened and closed by the cylinder piston system 15, 16 or by a cylinder piston system connected to the grab bucket.

According to the embodiment of FIG. 6, the boom section 7 is connected to the turntable 3 through the intervention of link means 25. The link means 25 is linked to the rear end 7a of the boom section 7, whereas the front section of the boom section 7 has linked thereto a longitudinally adjustable cylinder piston system 26 likewise connected to the turntable. This longitudinally adjustable cylinder piston system has one end thereof journalled preferably at the pivot 27 of the link or lever system 25. The actuation of the link means 25 is effected by a likewise rotatable hydraulic cylinder piston system 28 pivotally connected to the turntable.

FIG. 6 illustrates in dot-dash lines the extreme positions of the two boom sections 7 and 11 from a vertically upwardly directed position to a vertically downwardly directed position, while each intermediate position 29, 29', 29'', 29''', $29^{IV}$ is possible. When the drilling and soil-removing device according to FIG. 4 is connected to the lower end of the boom formed by the boom sections 7 and 11, it is possible to produce bores for poles and also to produce horizontal bores or upwardly inclined bores in hillsides. When the boom occupies a vertical or slant downwardly directed position, and when the tool 19 according to FIGS. 1, 2, 3 and 5 is provided, it is easily possible to produce vertical bulkheads.

As mentioned above, the boom section 11 is reciprocably movable in the direction of the double arrow 12 and is furthermore tiltable upwardly and downwardly in the direction of the double arrow 13, and can be rotated without limits in both directions as indicated by the double arrow 14.

It was furthermore set forth above that the boom section 7 is pivotable about the pivot 8 by means of piston rod 10.

With reference to FIGS. 8 and 9, it will be noted that the boom section 11 is journalled in the boom section 7 by means of a collar 111 on boom section 11 and by means of circular arranged rollers 112 supporting said collar 111. Collar 111, similar to the telescopic boom section 11 has a circular cross section. The rollers 112 are likewise arranged along a circle.

The rear end of the boom section 11 is provided with a hollow extension 113 which extends into a bush-shaped portion 114 of the boom section 7.

Mounted on the boom section 11 is a gearing 115 meshing with a pinion 116 adapted to rotate the telescopic boom section 11 in the direction of the double arrow 114 as will be seen from FIG. 9, the inner telescopic boom section 117 is journalled on the wheels of rollers 18 and is longitudinally displaceable in the direction of the double arrow 12. A fluid pressure operable cylinder piston system 119, 121 extends into the hollow inner telescopic boom section 117. The pressure fluid operable cylinder piston system 119, 121 is at 120 fixedly connected to the telescopic boom section 11 and has its piston rod 121 connected to the inner telescopic boom section 117. It will thus be evident that by actuating the cylinder piston system 119, 121 the inner telescopic boom section 117 will be movable in the direction of the double arrow 12 relative to the telescopic boom section 11. At the front end of said inner telescopic boom section 117 there is provided the pressure fluid receiving cylinder 15 with the piston rod 16.

The supply of pressure fluid to and withdrawal of pressure fluid from cylinders 15 and 119 is effected by two annular grooves 123, 124 provided in the extension 114 of the boom section 7. Communicating with said grooves 123, 124 are feeding and withdrawing conduits 125, 126 and hoses 127, 128 respectively leading to the cylinders 15 and 119 and provided with loops (not shown) in order to permit the outward movement of the inner telescopic section 117.

As will be seen from FIG. 7, the dredge is through the intervention of the turntable 3 connected with the understructure 33 of the vehicle frame which carries the running wheels 34 and the deviating wheels 35 for the track-laying chains 1. These chains can be driven, retarded or braked for steering in any convenient manner.

One end 36 of the understructure 33 has tiltably linked thereto at 38 a pair of triangularly-shaped booms 37. The free tip of the boom carries the wheel bearing 39 which in turn carries a half or full axle. The motor 40 is adapted to drive said half or full axle on which the tire-equipped wheels 41 are mounted. The driving motor 40 is so arranged on the boom or booms 37 that the latter can be tilted upwardly and downwardly together with the motor so that the wheels 41 are able to move into the position indicated by the numeral 41′. The tilting of the boom 37 is brought about by one or more fluid pressure cylinder piston systems 40 the piston rods 43 of which are linked to the third side of the triangle of the boom at 44. The pressure cylinder piston systems 42 are pivotally connected at 45 to the understructure 33.

The second end of the understructure 33 carries triangular booms 46 which are similar to the booms 37, and the front triangle tip of which again carries a wheel bearing 47 for the two wheels 48. The booms 46 have pivotally connected thereto piston rods 49 operable by pressure fluid cylinders 50 which are pivotally connected to the understructure at 51. The booms tiltable at 52 carry a steering rod device 53 by means of which the wheels 48 can be turned for steering purposes.

Advantageously, the cylinders 42, 50 are connected to a common source of pressure fluid by means of which it is possible simultaneously and together to adjust the piston rods 43 and 49 in such a way that a uniform lifting and lowering of the wheels 41, 48 will be possible.

The size and arrangement of the booms 37, 46 are so selected that it will be possible not only to move the wheels 41′, 48′ from their solid line positions to the positions 41, 48, but the steering device 53 and driving motor 40 can without affecting said adjusting movement be located on the booms so that the front end of the crane or dredge can be moved independently on a street by a tractor.

The steering device for the wheels 48 is diagrammatically shown in FIG. 10 from which it will be noted that by means of the two small cylinders 129 it is possible to adjust the wheels 48.

What we claim is:

1. A telescopic dredge which includes: an understructure, a turntable supported by said understructure, a boom having a first section supported by said turntable for selectively turning about a horizontal axis and about the axis of rotation of said turntable, said boom also having a second section telescopically adjustable relative to said first section, link means having one end pivotally connected to said turntable and having the other end pivotally connected to that end portion of said first boom section which is remote from said second boom section, and longitudinally adjustable means interposed between and pivotally connected to said turntable and that end portion of said first boom section which is adjacent said second boom section.

2. A dredge according to claim 1, which includes additional longitudinally adjustable means interposed between and pivotally connected to said link means and said turntable.

3. A telescopic dredge, which includes: track laying means and front and rear wheels arranged at opposite ends of said understructure and movable relative to said track laying means into the effective position for supporting the entire dredge and into their ineffective position to make said track laying means support said dredge, lever means respectively pivotally connected to opposite ends of said track laying means and having their outer ends supporting said wheels, fluid pressure operable cylinder piston means interposed between and pivotally connected to said understructure and said lever means for actuating the latter, and steering means operatively connected to one pair of said wheels and supported by the respective adjacent lever means.

4. A dredge according to claim 3, in which said steering means are located at one end portion of said understructure and include a steering linkage and a steering column.

5. A dredge according to claim 3, which includes driving motor means supported by those lever means which are remote from said steering means for driving the respective adjacent wheels.

6. A dredge according to claim 3, which includes a fluid pressure source common to said fluid pressure operable means respectively associated with said front and rear wheels for simultaneously supplying pressure fluid thereto.

7. A dredge according to claim 3, in which said wheels are provided with detachable tire rims replaceable by disc wheels with rail rims.

8. A dredge according to claim 3, in which said steering means is arrestable.

References Cited

UNITED STATES PATENTS

| 2,969,844 | 1/1961 | Hamrick | 175—315 X |
| 2,983,496 | 5/1961 | Grant | 175—315 X |
| 3,214,033 | 10/1965 | Nilsson | 212—55 |
| 3,224,608 | 12/1965 | Yadon et al. | 214—141 |
| 3,252,523 | 5/1966 | Kachnik et al. | 175—315 X |
| 3,298,540 | 1/1967 | Holan et al. | 212—55 |
| 3,357,502 | 12/1967 | Elliott | 173—28 X |
| 2,197,989 | 4/1940 | Tyler et al. | 175—91 |

FOREIGN PATENTS 1,359,044  3/1964  France.

HUGO O. SCHULZ, Primary Examiner

U.S. Cl. X.R.

173—28, 43; 175—315; 180—9; 280—43